No. 722,681. PATENTED MAR. 17, 1903.
W. H. DE BAUN.
ICE CUTTING MACHINE.
APPLICATION FILED FEB. 7, 1902.
NO MODEL. 3 SHEETS—SHEET 1.

WITNESSES:
Gus. Lang
Louis A. Piaget

INVENTOR.
William H. De Baun
BY John F. Kerr
ATTORNEY.

No. 722,681. PATENTED MAR. 17, 1903.
W. H. DE BAUN.
ICE CUTTING MACHINE.
APPLICATION FILED FEB. 7, 1902.
NO MODEL. 3 SHEETS—SHEET 2.
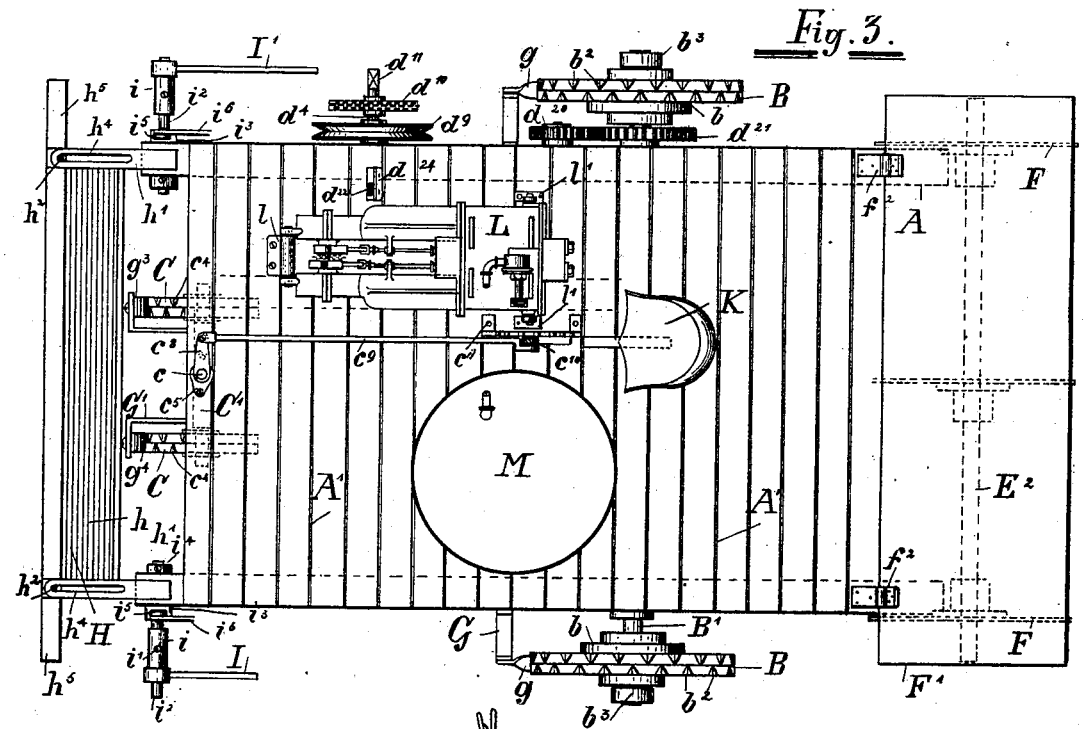
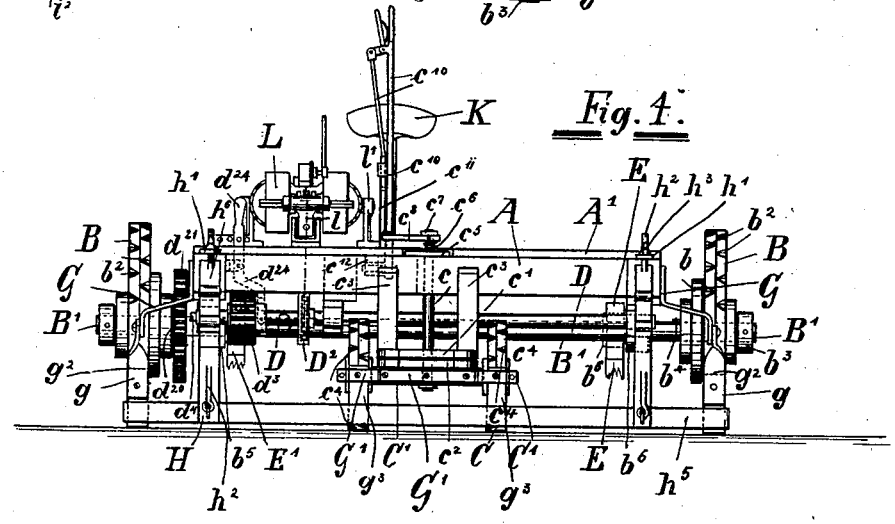
WITNESSES: INVENTOR.
William H. DeBaun
BY John F. Kerr
ATTORNEY.

No. 722,681. PATENTED MAR. 17, 1903.
W. H. DE BAUN.
ICE CUTTING MACHINE.
APPLICATION FILED FEB. 7, 1902.
NO MODEL. 3 SHEETS—SHEET 3.

WITNESSES:
L. F. Boice
Samuel Greenwood

INVENTOR.
William H. De Baun
BY John F. Kerr
ATTORNEY.

THE NORRIS PETERS CO., PHOTO-LITHO., WASHINGTON, D. C.

UNITED STATES PATENT OFFICE.

WILLIAM H. DE BAUN, OF RAMSEY, NEW JERSEY.

ICE-CUTTING MACHINE.

SPECIFICATION forming part of Letters Patent No. 722,681, dated March 17, 1903.

Application filed February 7, 1902. Serial No. 92,985. (No model.)

*To all whom it may concern:*

Be it known that I, WILLIAM H. DE BAUN, a citizen of the United States, residing at Ramsey, in the county of Bergen and State of New Jersey, have invented certain new and useful Improvements in Ice-Cutting Machines, of which the following is a specification, reference being had therein to the accompanying drawings.

This invention relates to ice-cutting machines; and the object of the invention is to provide an efficient automobile ice cutting and hoisting machine to be operated by steam, gasolene, or electricity, and which may be easily turned in cutting ice on ponds, lakes, or rivers, and which can be regulated with facility for cutting the ice into cakes or blocks in predetermined sizes, the vehicle, hoisting apparatus, and the saws being operated by an engine.

With these ends in view the invention consists in the novel construction and combination of elements and arrangements of parts, which will be hereinafter fully described and claimed.

To enable others to understand the invention, I have illustrated the preferred embodiment thereof in the accompanying drawings, forming a part of this specification, and in which—

Figure 1:
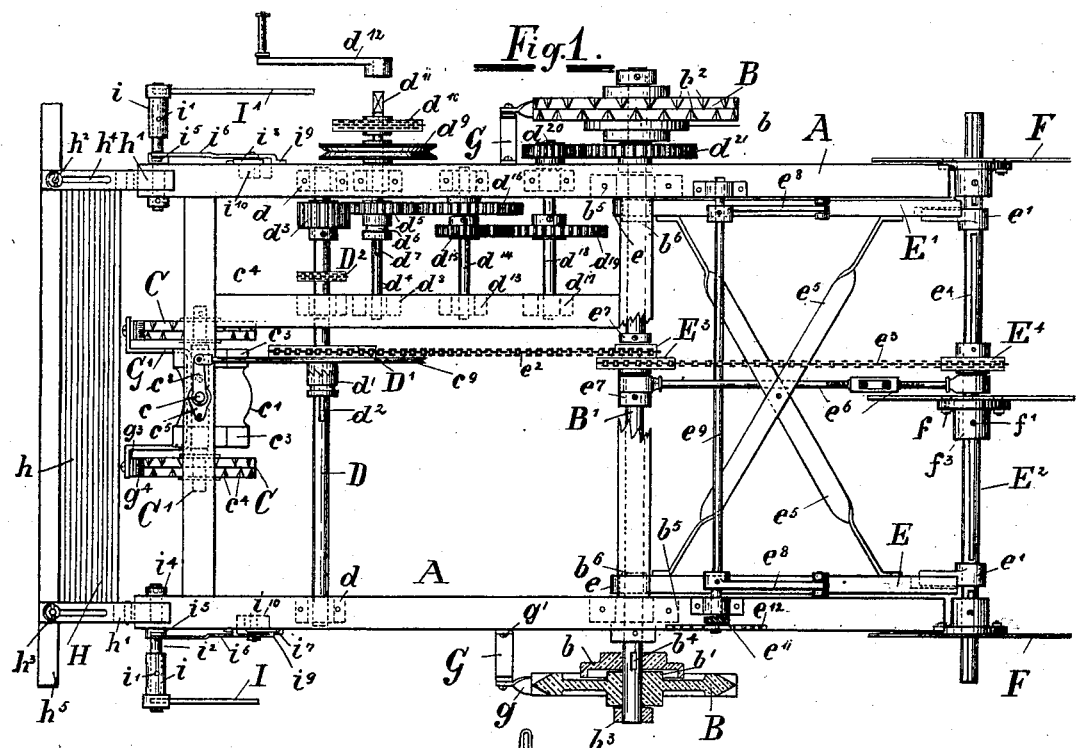
Figure 2:
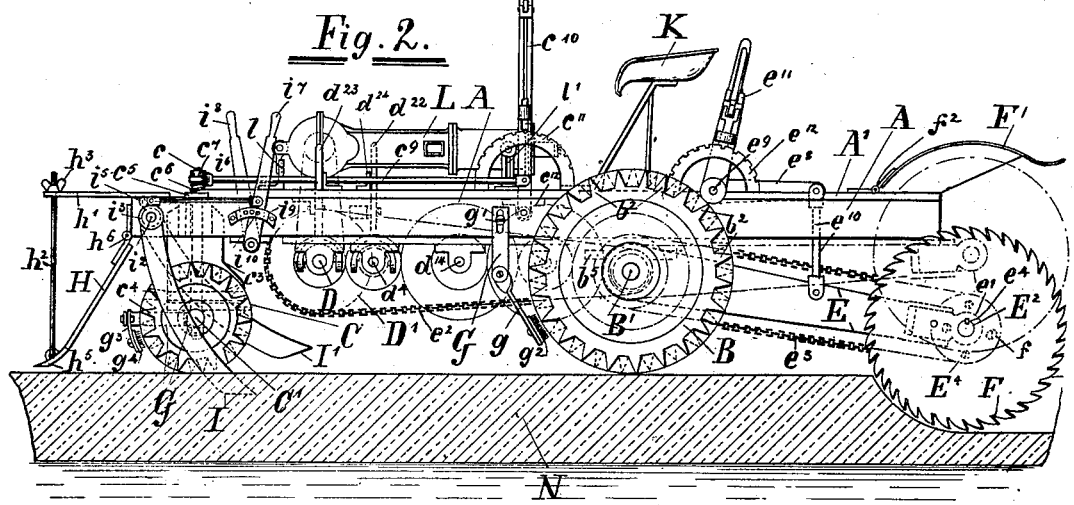
Figure 5:
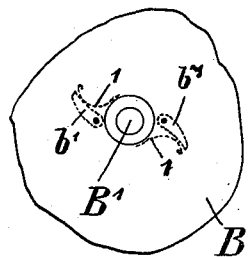
Figure 6:
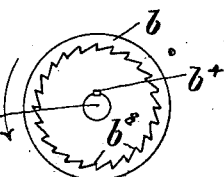
Figure 7:
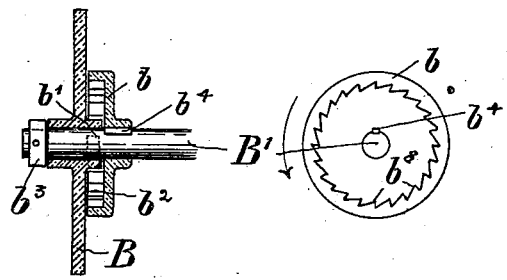
Figure 8:
Figure 10:
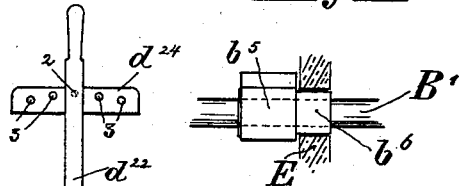
Figure 9:
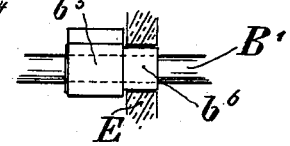
Figure 12:
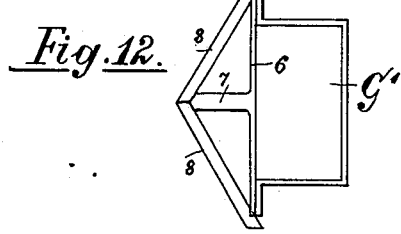
Figure 13:
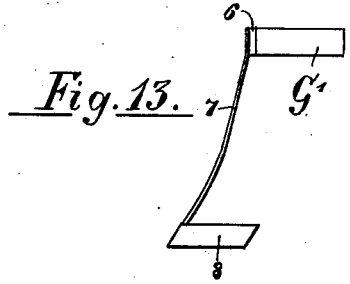
Figure 11:
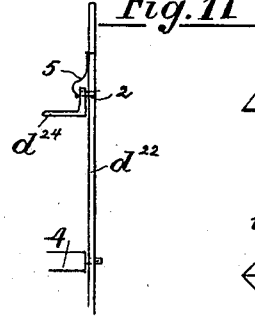
Figure 14:
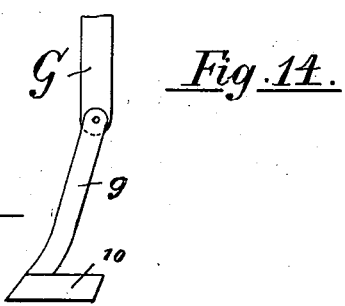
Figure 15:
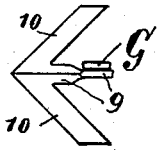

Figure 1 is a plan view of my vehicle, the floor, engine, and boiler being removed, constructed in accordance with my invention. Fig. 2 is a side elevation of my machine in working position on the ice. Fig. 3 is a plan view of same complete, showing the location of steam boiler and engine when same is used; and Fig. 4 is a front elevation of my machine. Fig. 5 shows a portion of a wheel provided with pivoted pawls adapted to coöperate with the teeth of a ratchet-clutch. Fig. 6 is a sectional view of portion of an axle, a loose wheel, and a ratchet-clutch. Fig. 7 shows the inside of a portion of the clutch secured to the shaft. Figs. 8 and 9 are respectively a front and a side view of the bearing $b^5$, having the extension $b^6$, upon which the arms E E' are pivoted. Figs. 10 and 11 are a front and side view of the lever $d^{22}$ on the shaft $d^4$, the perforated stop-bracket $d^{24}$ adapted to receive the pin 2 of said lever and the pivotal support 4 for said lever. Figs. 12 and 13 are the top and side views of the V-shaped shoe in front of the steering-wheels; and Figs. 14 and 15 are a side and top view, respectively, of the V-shaped shoe in front of the driving-wheel.

Like characters denote like and corresponding parts in each of the several figures of the drawings.

Upon the frame A the floor A' and the other parts of the machine are supported.

The driving-wheels B B are provided with a clutch portion $b'$ and are mounted on the shaft B', on which a ratchet-clutch $b$ is secured by a key $b^4$, and a collar $b^3$ on the end of the shaft B' keeps the driving-wheel B from sliding off the axle. The wheels B are driven by the ratchet-clutch $b$. The teeth on the inside of the peripheral flange of $b$ (see $b^8$, Fig. 7) are engaged by the pawls $b^7$, which are pressed into engagement by the spring 1, and the clutch $b$ being secured to the axle B' the wheels B may be moved to propel the vehicle forward; but in turning one wheel stands still and the pawls in that wheel slip over the teeth $b^8$. The driving-wheel shaft B' is mounted in bearings $b^5$, which have an extended portion $b^6$, which is utilized as hereinafter will be described.

The front or narrow-gaged steering-wheels C C are mounted on the axle C', which is secured to the lower platform $c^2$, and the vertical steering-bar $c$, which is secured to the axle C' and the said platform $c^2$, passes through and turns in a central opening of the upper platform $c'$, which is in turn secured to the frame A by the uprights $c^3 c^3$. The two platforms $c'$ and $c^2$ thus form a short-turning gear or fifth-wheel. A bearing for the steering-bar $c$ is indicated in the frame A by $c^5$, and a spring $c^6$ surrounds the said steering-bar between the bearing and the lever $c^8$, which is secured to the top thereof by the collar $c^7$. A connecting-rod $c^9$ extends from the lever $c^8$ to the lever $c^{10}$.

The throttle-holder and the bearing for the throttle-lever are indicated by $c^{11}$ and $c^{12}$, respectively.

One of the essential features of my invention is the novel construction of my wheels and the short-turning gear for ice-cutting machines. The ratchet-clutch on the driving-wheels B B and the steering-wheels C C enable the operator to make a very short turn to make a new cut or to cross-cut. When the steering-wheels are turned under the vehicle in going to the right, the right driving-wheel becomes a pivot, ceasing to revolve, and the left driving-wheel turns, and it is just the reverse when steering to the left, the left-hand driving-wheel ceasing to revolve and the right driving-wheel turning, describing a circle or the arc of a circle.

Instead of a wheel having tires provided with spikes I provide a wheel the tire of which is constructed with a centrally-located chisel-shaped circumferential ridge and a series of ridges of substantially the same shape, which extend from said central ridge to the face of the wheel, one to the right and one to the left, alternating all around the wheel, the top of each lateral ridge being flush with the top of the central or middle ridge. The lateral ridges on the driving-wheel tires are indicated by $b^2$ and on the steering-wheels by $c^4$, and their sloping sides do not pick up the snow or ice. The same is true of the central or middle ridge, its sides being beveled.

Another essential feature of my invention is that my engine may be made to propel the vehicle and operate the saws at the same time or propel the vehicle without cutting, or, finally, it may take the place of a stationary engine to operate a hoisting device for storing or loading ice.

The main driving-shaft of my machine is indicated by D and is mounted in the bearings $d$ on the frame A. The wheel D' is loose upon the shaft D and is provided with complementary teeth which are adapted to be engaged by the similar teeth of the longitudinally-movable clutch element $d'$, which has a feather or tongue entering a groove $d^2$ in the shaft D, causing it to revolve with the said shaft and permitting it to be moved into and out of engagement with the teeth of the wheel D'. So it is that the clutch $d'$ and the wheel D' may be interlocked when it is desired to operate the saws F and released when it is the intention only to propel the vehicle without cutting ice. A sprocket-chain $e^2$ connects the sprocket-wheel D' and the sprocket-wheel $E^3$, which is double and is mounted loosely on the driving-wheel shaft B', and the chain $e^3$ connects the wheels $E^3$ and $E^4$, the wheel $E^4$ being secured to the saw-shaft $E^2$, which is adapted to carry one or more saws F, which are secured thereto at any point desired by means of a feather-joint $e^4$. The saw is secured to the hub $f^3$ by bolts $f$, and the hub is secured to the shaft $E^2$ by set-screw $f'$, and a fender F' is fastened to the frame A over the saws by hinges $f^2$. The saw-shaft $E^2$ is mounted in bearings $e'$ on the ends of the arms E and E', which are connected by the braces $e^5$. The arms E and E' are hung by the brackets $e$ on the extension $b^6$ of the driving-wheel bearing $b^5$. The saw-shaft $E^2$ may be raised and lowered at pleasure of the operator who is running the machine by the manipulation of the lever $e^{11}$, which is operatively connected with the arms E and E' by the lever $e^8$ on the shaft $e^9$ and the connecting-rod $e^{10}$ and may be held in the position desired by the holder $e^{12}$. Rods and turnbuckle $e^6$ connect the driving-wheel shaft and the saw-shaft, and thereby the slack in the chain may be lessened, as the bearings $e'$ on the ends of the arms E and E' are adjustable for the purpose of tightening or loosening the chain. Collars $e^7$ on the driving-wheel shaft serve to secure the double sprocket $E^3$ and turnbuckle in true position.

To the main driving-shaft D is secured the sprocket-wheel $D^2$, which is connected by chain to the engine to convey a rotary motion to the main driving-shaft and to communicate a rotary motion to the saw-shaft. When the operator wishes to propel the vehicle or to hoist without rotating the saws, he disconnects the clutch $d'$ by manipulating the lever $d^{23}$, which permits the driving-shaft D to rotate without turning the sprocket-wheel D'.

The driving-wheels B B on the shaft B' are driven from the main driving-shaft D through the train of gears $d^3$, a double-width gear secured to the main driving-shaft D, $d^5$, $d^{15}$, $d^{16}$, $d^{19}$, and $d^{20}$, gears keyed, respectively, to the intermediary shafts $d^4$, $d^{14}$, and $d^{18}$, intermeshing with each other, the last of which meshes with the gear $d^{21}$, which is secured to the driving-wheel shaft B'. The bearings for said intermediary shafts are secured to the frame A and are indicated in the drawings by $d^8$, $d^{13}$, and $d^{17}$, respectively.

As shown in Figs. 1 and 2, the machine is geared and fixed to be propelled at a desired speed and to cut ice while going. If, however, the operator wishes to stop cutting ice and to have the vehicle remain stationary for the purpose of running the engine solely for the purpose of hoisting ice to load or store it away, he accomplishes his purpose by disconnecting the clutch $d'$ from the wheel D' and by operating the lever $d^{22}$, thus moving the gear $d^5$ laterally on the shaft $d^4$, to which it is connected by a feather-joint $d^7$ in its hub $d^6$, which operation leaves the said gear $d^5$ in mesh only with the gear $d^3$. Thus only the shaft $d^4$ will receive a rotary motion from the main driving-shaft D. A suitable wheel, either rope, as $d^9$, or sprocket, as $d^{10}$, may be secured to said shaft $d^4$ for hoisting, and the end of said shaft may be square $d^{11}$, to be operated by a hand-crank $d^{12}$, if desired for any reason.

The lever $d^{22}$, which is loosely but operatively connected with the hub of the wheel $d^5$ in order to move it laterally in and out of engagement with the wheel $d^{16}$, may be locked in position by any suitable means, such as shown in Fig. 10, where the pin 2 in the lever is adapted to enter openings 3 in the bracket $d^{24}$, which is movable on a support 4 and is pressed into position against the bracket $d^{24}$ by the spring 5. (See Fig. 11.)

I propose to use on my completed machine shoes for each of the wheels, with or without brushes, and do not wish to limit myself to the shoe-holders G and G' shown and the shoes $g$ and $g^3$, having a brush $g^2$ and $g^4$. An ordinary V-shaped shoe in front of each wheel would answer the purpose and could be secured at any desired angle, the holder being adjustably held by a screw $g'$.

In Figs. 12 and 13, 6 indicates the cross-rail on frame $g'$, 7 an arm, and 8 the side of the V-shaped shoe for steering-wheels. In Figs. 14 and 15, 9 is an arm on G, and 10 the sides of the V-shaped shoe for the driving-wheels.

H denotes an adjustable fender having a net or apron $h$, which may be raised and lowered and on either or both ends to pitch the snow to one side of the machine during its progress. The fender is held in the bracket $h'$, which is provided with the slots $h^4$, by the bolts and thumb-nuts $h^2$ and $h^3$ and the hinges $h^6$ and is provided with a sharp curved toe-piece $h^5$, extending a part or the whole of the way across the front of the machine.

Gages I and I', fastened to sleeves $i$, are secured where desired on the shafts $i^2$, which turn loose in the front part of the frame A by set-screws $i'$. Collars on inside and outside of frame are indicated by $i^3$ and $i^4$, and a projection or lever $i^5$ and connecting-rods $i^6$ connect with the levers $i^7$ and $i^8$, which are limited in their movement by the stop $i^9$ and are held in the position by the pin $i^{10}$.

M indicates the boiler; N, the ice; $l$, a bearing for the engine L on the floor of the vehicle; $l'$, a bearing at the other end of the engine, and K the seat for the person operating my automobile ice-cutting machine.

Having thus described the invention, what I claim, and desire to secure by Letters Patent, is—

The combination, with a frame, a traction-shaft provided with traction-wheels, and a counter-shaft journaled in the frame; of arms pivoted to the said traction-shaft, a cutter-shaft journaled in the free end portions of the said arms, ice-cutters secured on the said cutter-shaft, means for raising and lowering the said cutters, a sprocket-pinion secured on the said cutter-shaft, a sprocket-wheel secured on the said counter-shaft, a sprocket-wheel and a sprocket-pinion secured together and mounted loose on the said traction-shaft, and drive-chains connecting the said wheels and pinions in pairs, substantially as set forth.

In testimony whereof I affix my signature in presence of two witnesses.

WILLIAM H. DE BAUN.

Witnesses:
JOHN F. KERR,
ERNEST C. LEERS.